No. 746,277. PATENTED DEC. 8, 1903.
J. N. BRENNAN.
JOINT AND PIPE SUPPORT.
APPLICATION FILED JUNE 9, 1903.
NO MODEL. 2 SHEETS—SHEET 1.

WITNESSES:
Geo. D. Richards
W. B. Fraentzel

INVENTOR:
James N. Brennan,
BY
Fred C. Fraentzel.
ATTORNEY

No. 746,277. PATENTED DEC. 8, 1903.
J. N. BRENNAN.
JOINT AND PIPE SUPPORT.
APPLICATION FILED JUNE 9, 1903.
NO MODEL. 2 SHEETS—SHEET 2.

WITNESSES: Geo. D. Richards, W. B. Fraentzel.

INVENTOR: James N. Brennan, BY Fred'k C. Fraentzel, ATTORNEY

No. 746,277. Patented December 8, 1903.

UNITED STATES PATENT OFFICE.

JAMES N. BRENNAN, OF NEWARK, NEW JERSEY.

JOINT AND PIPE SUPPORT.

SPECIFICATION forming part of Letters Patent No. 746,277, dated December 8, 1903.

Application filed June 9, 1903. Serial No. 160,680. (No model.)

*To all whom it may concern:*

Be it known that I, JAMES N. BRENNAN, a citizen of the United States, residing at Newark, in the county of Essex and State of New Jersey, have invented certain new and useful Improvements in Joint and Pipe Supports; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference to improvements in that class of devices which may be employed as a pipe and joint support; and the present invention has for its principal objects to provide a simple and cheaply-constructed supporting device which is to be used in connection more especially with lead pipes which are placed in the earth and are employed for the connection of a water-main in the street with the system of piping in a building. These pipes which are employed for connecting the water-main with the system of piping in a building usually comprise a pair of lead-pipe sections which have arranged between a pair of lead joints the usual valve-casing and its valve for turning on and shutting off the supply of water, and this portion of the pipe being the weakest portion, with the weight of the earth above the joints, often becomes separated or broken at the joints, whereby a leakage and consequent waste of water is the result. To overcome this serious defect, I have provided a joint and pipe support of the character hereinafter more particularly described.

The invention therefore consists in the novel joint and pipe support hereinafter set forth; and, furthermore, this invention consists in the various arrangements and combinations of the parts, as well as in the details of the construction thereof, all of which will be more fully described in the accompanying specification and then finally embodied in the clauses of the claim, which are appended to and form a part of this specification.

The invention is clearly illustrated in the accompanying drawings, in which—

Figure 1:
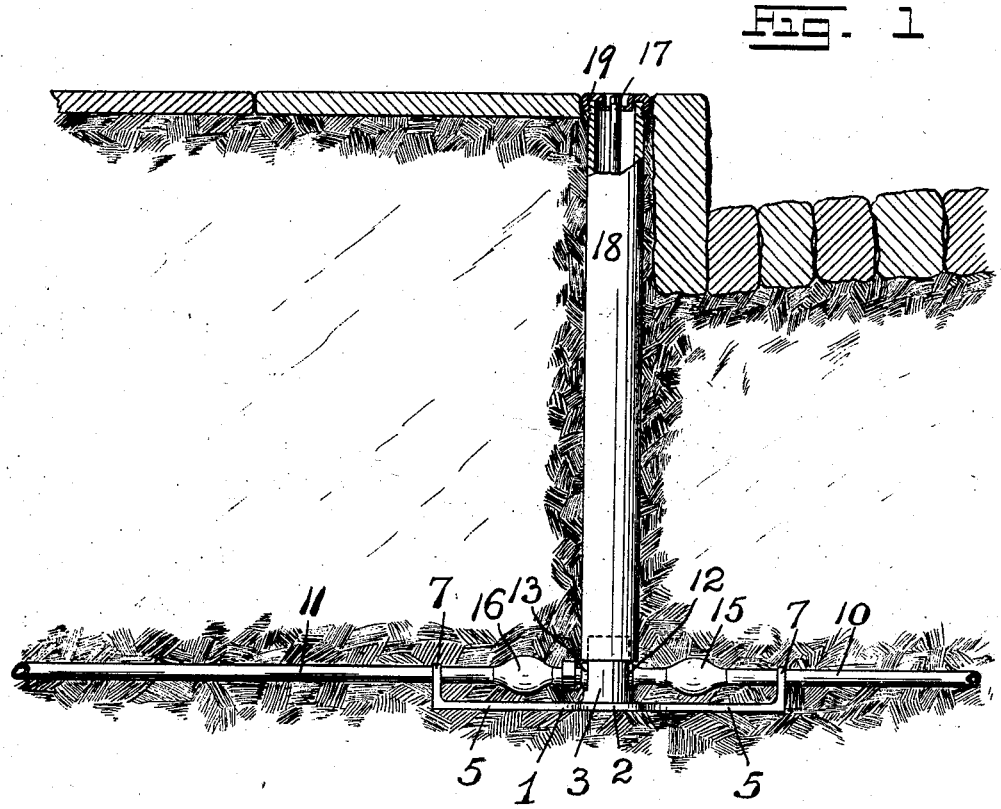
Figure 2:
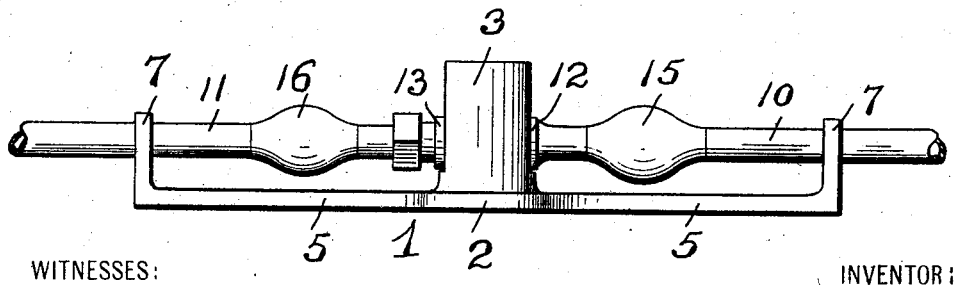
Figure 3:
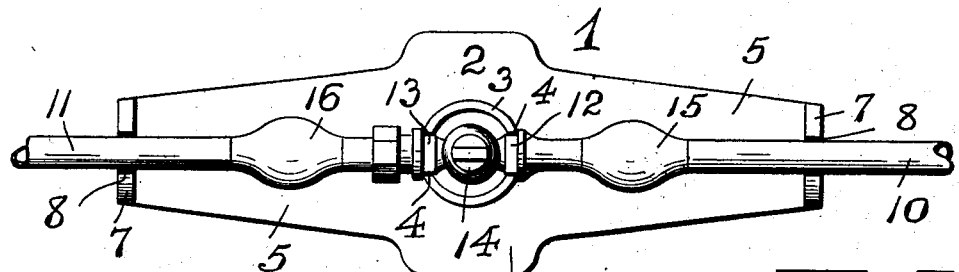
Figure 4:
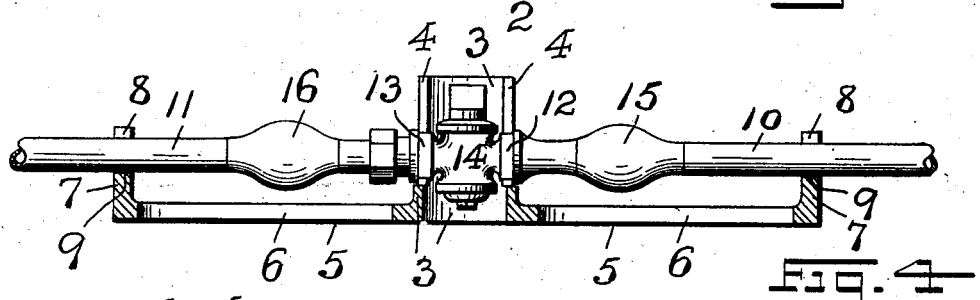
Figure 5:
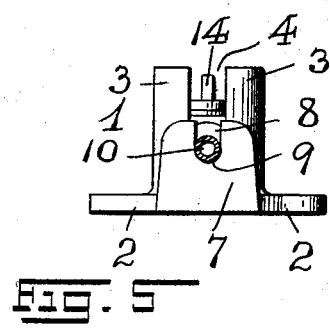
Figure 6:
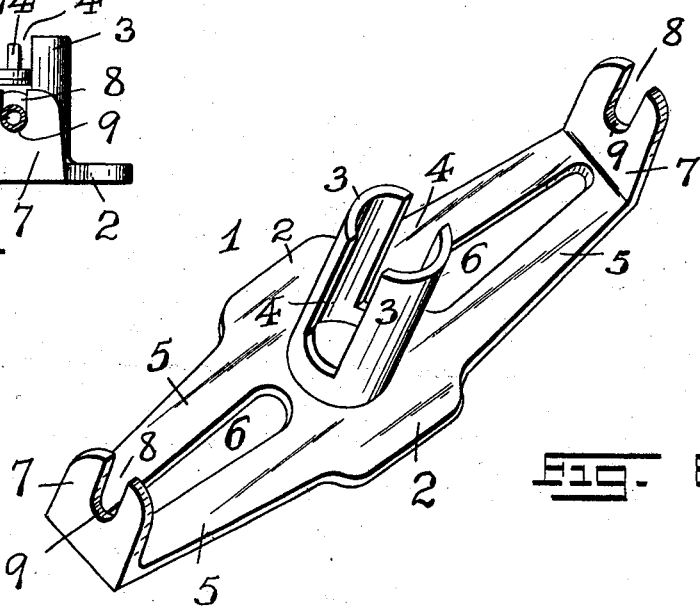

Figure 1 is a side elvation of a portion of lead pipe and its joints, as well as a side view of the joint and pipe support embodying the principles of this invention, said view illustrating in connection therewith, partly in side elevation and partly in section, the usual vertical tube or box in which the rod for turning on or off the valve in the valve-casing is arranged, the earth, part of the street-pavement, the curb, and part of the sidewalk being represented in transverse vertical section. Fig. 2 is a side elevation of the joint and pipe support and the pipe-sections and pipe connections supported thereby, the said view being made on a slightly-enlarged scale. Fig. 3 is a top or plan view of the parts represented in said Fig. 2. Fig. 4 is a longitudinal vertical section of the joint and pipe support, the portions of the lead pipe, their joints, and the valve casing, however, being represented in position in the support in side elevation; and Fig. 5 is an end view of the joint and pipe support, with the pipe represented in transverse vertical section. Fig. 6 is a perspective view of the said joint and pipe support.

Similar characters of reference are employed in all of the said above-described views to indicate corresponding parts.

In the said drawings the reference character 1 indicates the complete joint and pipe support, the same comprising a suitable base-plate 2 of any desired configuration, the said plate being provided with a suitable and, preferably, centrally-disposed receiving member 3. This member 3 is preferably cylindrical, as illustrated; but it may be of any other suitable shape, and it is provided in its opposite sides with receiving-openings 4. The said base-plate 2 is made with the oppositely-extending and elongated portions or members 5, preferably provided with openings 6 to reduce the weight of the device and also the cost of the metal in which the said device is cast. Each longitudinally-extending portion or member 5 is provided at or near its free end with an upwardly-projecting flange or member 7, a receiving-opening 8, which is preferably fork-shaped, being formed in each member 7, and each receiving-opening having the rounded supporting or bearing portion 9, as clearly illustrated in Fig. 6 of the drawings. The said openings 8 in the members 7 and the openings 4 in the member 3 are all in alinement, as will be clearly seen from an inspection of the several figures.

Referring now to Figs. 1 to 4, inclusive, the reference character 10 indicates the usual lead-pipe section leading from the water-main in the street, and 11 is the lead-pipe section which is connected with the system of piping in a building. In practice these pipe-sections 10 and 11 are connected with the respective ends 12 and 13 of a valve-casing 14, in which is arranged the usual shut-off valve by means of the ordinary wipe or lead points 15 and 16. Now it has been found in practice that the great weight of earth resting upon these parts often presses the connected pipe-sections out of shape and sufficiently weakens or strains the joints 14 and 15 that a leak will be produced or that very often the joint becomes entirely broken and separated from either the pipe-section or the valve-casing member. To avoid this serious difficulty, I have provided the hereinabove-described joint and pipe support, which is placed in the excavation directly beneath and in alinement with the connected pipe-sections 10 and 11 in such a manner that the valve-casing 14 is arranged directly within the receiving member 3, and its casing-sections or end members 12 and 13 rest firmly in the bearing portions formed by the receiving-openings 4 of said member 3. At the same time the pipe-sections 10 and 11 are arranged in the receiving-openings 8 of the respective members 7 and rest directly upon the curved bearing portions 9 of said members 7, as clearly indicated in Fig. 4 of the drawings. A fixed support is thereby provided for the connected pipe-sections 10 and 11 and for the valve-casing arranged between said pipe-sections, the various parts being thereby held against any lateral or vertical displacement, as will be clearly understood. Furthermore, all strain due to the weight of the earth above these parts is removed from the more or less delicate joints 15 and 16, and in consequence thereof there can be no breaks or leaks caused at the joints produced by the excessive weight of the earth above said joints or caused by the settling of the earth beneath the connected pipe-sections.

That the valve in the valve-casing 14 may be turned on or off by means of the usual valve rod or stem 17, a vertical tube or box 18 may be slipped over the cylindrical member 3, as represented in Fig. 1, the said tube or box 18 being embedded in the earth, as shown, and being provided at the top, near the curb, with a removable cap or cover 19.

From the previous description of my invention it will be seen that I have produced a simple and efficient device of the character and for the purposes described which can readily be placed in position and which prevents any accidental displacement of the pipe-sections and removes all strain from the connecting pipe-joints.

I am aware that some changes may be made in the construction of the supporting device as well as in the general arrangements and combinations of the parts without departing from the scope of my invention. Hence I do not limit my invention to the exact arrangements and combinations of the parts as described in the foregoing specification and as illustrated in the accompanying drawings, nor do I confine myself to the exact details of the construction of the said parts.

Having thus described my invention, what I claim is—

1. A joint and pipe support comprising a base-plate having a flat and longitudinally-extending supporting member above which a pipe and pipe-joint is arranged, and an upwardly-extending flange on said member near the free end of said member, said flange being made with a fork-shaped pipe-receiving portion forming a bearing in which the pipe rests, substantially as and for the purposes set forth.

2. A joint and pipe support comprising a base-plate having a pair of oppositely-extending members, and an upwardly-extending flange on each member, each flange being made with a fork-shaped pipe-receiving portion forming a bearing in which the pipe rests, substantially as and for the purposes set forth.

3. A joint and pipe support comprising a base-plate having a pair of oppositely-extending members, a centrally-disposed receiving member on said base-plate provided in its opposite sides with receiving-openings forming bearing portions, and a pipe-receiving bearing portion on each oppositely-extending member, substantially as and for the purposes set forth.

4. A joint and pipe support comprising a base-plate having a pair of oppositely-extending members, a centrally-disposed receiving member on said base-plate provided in its opposite sides with receiving-openings forming bearing portions, and an upwardly-extending flange on each oppositely-extending member, each flange being provided with a pipe-receiving bearing portion, substantially as and for the purposes set forth.

5. The combination, with a pair of pipe-sections, a valve-casing having ends 12 and 13, and connecting-joints, of a joint and pipe support comprising a base-plate having a pair of oppositely-extending members, a centrally-disposed receiving member on said base-plate in which said valve-casing is arranged, said receiving member being provided in its opposite sides with receiving-openings in which said ends 12 and 13 of the valve-casing are arranged, and bearing portions on said oppositely-extending members of the support, in which said pipe-sections are arranged, substantially as and for the purposes set forth.

6. The combination, with a pair of pipe-sections, a valve-casing having ends 12 and 13, and connecting-joints, of a joint and pipe support comprising a base-plate having a pair of oppositely-extending members, a centrally-disposed receiving member on said base-plate in which said valve-casing is arranged, said receiving member being provided in its opposite sides with receiving-openings in which said ends 12 and 13 of the valve-casing are arranged, and upwardly-extending flanges on said oppositely-extending members, each flange having a receiving-opening provided with a bearing portion on which said pipe-sections are arranged, substantially as and for the purposes set forth.

7. The combination, with a pair of pipe-sections, a valve-casing having ends 12 and 13, and connecting-joints, of a joint and pipe support comprising a base-plate having a pair of oppositely-extending members, a centrally-disposed receiving member on said base-plate in which said valve-casing is arranged, said receiving member being provided in its opposite sides with receiving-openings in which said ends 12 and 13 of the valve-casing are arranged, and bearing portions on said oppositely-extending members of the support, in which said pipe-sections are arranged, and a vertically-extending valve-stem box having its lower end arranged over said centrally-disposed receiving member, substantially as and for the purposes set forth.

8. The combination, with a pair of pipe-sections, a valve-casing having ends 12 and 13, and connecting-joints, of a joint and pipe support comprising a base-plate having a pair of oppositely-extending members, a centrally-disposed receiving member on said base-plate in which said valve-casing is arranged, said receiving member being provided in its opposite sides with receiving-openings in which said ends 12 and 13 of the valve-casing are arranged, and upwardly-extending flanges on said oppositely-extending members, each flange having a receiving-opening provided with a bearing portion on which said pipe-sections are arranged, and a vertically-extending valve-stem box having its lower end arranged over said centrally-disposed receiving member, substantially as and for the purposes set forth.

In testimony that I claim the invention set forth above I have hereunto set my hand this 6th day of June, 1903.

JAMES N. BRENNAN.

Witnesses:
   FREDK. C. FRAENTZEL,
   W. B. FRAENTZEL.